United States Patent
Blanchard et al.

(10) Patent No.: US 10,591,587 B2
(45) Date of Patent: Mar. 17, 2020

(54) WEAPONS COUNTER MEASURE METHOD AND APPARATUS

(71) Applicant: BAE SYSTEMS PLC, London (GB)

(72) Inventors: Paul Michael Blanchard, South Gloucestershire (GB); Nicholas Giacomo Robert Colosimo, Preston (GB)

(73) Assignee: BAE Systems plc, London (GB)

( * ) Notice: Subject to any disclaimer, the term of this patent is extended or adjusted under 35 U.S.C. 154(b) by 176 days.

(21) Appl. No.: 15/564,356

(22) PCT Filed: Apr. 7, 2016

(86) PCT No.: PCT/GB2016/050980
§ 371 (c)(1),
(2) Date: Oct. 4, 2017

(87) PCT Pub. No.: WO2016/162680
PCT Pub. Date: Oct. 13, 2016

(65) Prior Publication Data
US 2018/0128908 A1 May 10, 2018

(30) Foreign Application Priority Data

Apr. 10, 2015 (GB) .................................. 1506200.3
Aug. 4, 2015 (EP) ..................................... 15275183

(51) Int. Cl.
*G01S 7/495* (2006.01)
*F41H 11/00* (2006.01)
(Continued)

(52) U.S. Cl.
CPC .............. *G01S 7/495* (2013.01); *F41H 11/00* (2013.01); *G02F 1/29* (2013.01); *F41H 13/005* (2013.01)

(58) Field of Classification Search
CPC .......... G01S 7/495; F41H 11/00; F41H 11/02; F41H 13/00; F41H 13/005
See application file for complete search history.

(56) References Cited

U.S. PATENT DOCUMENTS 4,686,605 A * 8/1987 Eastlund .................. F41G 7/224
244/158.1
4,999,637 A * 3/1991 Bass ...................... H04B 7/145
342/367

(Continued)

FOREIGN PATENT DOCUMENTS

DE       10245682 A1    4/2004
WO        9428361 A1   12/1994
(Continued)

OTHER PUBLICATIONS

International Preliminary Report on Patentability of International Application No. PCTGB2016050873, dated Oct. 19, 2017, 8 pages.

(Continued)

*Primary Examiner* — Peter M Bythrow
(74) *Attorney, Agent, or Firm* — Maine Cernota & Rardin

(57) ABSTRACT

A directed-energy weapon counter measure apparatus and method for modifying a path of a focused electromagnetic energy beam (204) emitted by a directed energy weapon system so as to deflect it from a platform (200), the apparatus comprising an electromagnetic radiation source, communicably coupled to a control system. The control system is configured to create an atmospheric element (202) operative to simulate a physical electromagnetic radiation path modifying device within an atmospheric volume located in the path of the focused electromagnetic radiation beam (204) by causing electromagnetic radiation from the source to be applied to a selected plurality of three-dimensional portions of said atmospheric volume so as to heat and/or ionise the air (Continued)

with in said portions, wherein said selected portions are spatially located together in a substantially unbroken, three-dimensional configuration.

15 Claims, 9 Drawing Sheets

(51) Int. Cl.
  *G02F 1/29* (2006.01)
  *F41H 13/00* (2006.01)

(56) References Cited

U.S. PATENT DOCUMENTS

| | | | | |
|---|---|---|---|---|
| 5,041,834 | A * | 8/1991 | Koert | H01Q 3/2658 342/367 |
| 5,269,288 | A | 12/1993 | Stirbl et al. | |
| 5,400,688 | A * | 3/1995 | Eninger | F41H 11/02 89/1.11 |
| 5,415,156 | A * | 5/1995 | Stirbl | F41H 13/00 126/714 |
| 5,593,549 | A * | 1/1997 | Stirbl | F24S 50/00 203/10 |
| 5,684,621 | A | 11/1997 | Downing | |
| 6,111,237 | A * | 8/2000 | Paustian | H02G 13/20 219/687 |
| 6,377,436 | B1 * | 4/2002 | Margolin | G21K 1/00 307/149 |
| 7,255,062 | B1 * | 8/2007 | Higman | H05H 1/46 118/723 AN |
| 8,981,261 | B1 * | 3/2015 | Tillotson | F41H 13/0093 219/201 |
| 9,305,378 | B1 | 4/2016 | Holmes | |
| 2003/0160724 | A1 | 8/2003 | Alexoff | |
| 2004/0135744 | A1 | 7/2004 | Bimber | |
| 2007/0114322 | A1 * | 5/2007 | Smereczniak | B64C 30/00 244/1 N |
| 2007/0180983 | A1 * | 8/2007 | Farinella | F41H 5/026 89/36.07 |
| 2009/0009862 | A1 | 1/2009 | Hong | |
| 2009/0084252 | A1 | 4/2009 | Marquis | |
| 2009/0171477 | A1 * | 7/2009 | Nayfeh | G02F 1/0147 700/12 |
| 2010/0258708 | A1 | 10/2010 | Meyers et al. | |
| 2010/0319526 | A1 * | 12/2010 | Imholt | F41B 9/0087 89/36.08 |
| 2011/0001429 | A1 | 1/2011 | Davis | |
| 2011/0121158 | A1 | 5/2011 | Corke et al. | |
| 2013/0057151 | A1 * | 3/2013 | Curry | H05H 1/52 315/111.21 |
| 2013/0099096 | A1 * | 4/2013 | Hutchin | F41G 3/147 250/208.1 |
| 2014/0125964 | A1 * | 5/2014 | Jonas | F41H 13/005 356/4.01 |
| 2014/0176954 | A1 * | 6/2014 | Scott | F41H 3/00 356/445 |
| 2014/0224776 | A1 | 8/2014 | Elhadj | |
| 2014/0327747 | A1 | 11/2014 | Kong | |
| 2016/0097616 | A1 * | 4/2016 | Weigold | F41H 13/0062 250/396 R |
| 2014/7011854 | | 4/2017 | Kuri | |
| 2017/0127507 | A1 * | 5/2017 | Hunt | H05H 1/46 |
| 2017/0212602 | A1 | 7/2017 | Hsu | |
| 2018/0084244 | A1 | 3/2018 | Colosimo | |
| 2018/0088436 | A1 | 3/2018 | Colosimo | |
| 2018/0095169 | A1 | 4/2018 | Blanchard | |
| 2018/0128908 | A1 | 5/2018 | Blanchard | |
| 2018/0143303 | A1 | 5/2018 | Colosimo | |

FOREIGN PATENT DOCUMENTS

| | | |
|---|---|---|
| WO | 2002056111 A1 | 7/2002 |
| WO | 2011057342 A1 | 5/2011 |
| WO | 2011063407 A2 | 5/2011 |
| WO | 2013039465 A1 | 3/2013 |

OTHER PUBLICATIONS

International Preliminary Report on Patentability of International Application No. PCTGB2016050984, dated Oct. 19, 2017, 10 pages.
International Preliminary Report on Patentability of International Application No. PCTGB2016051003, dated Oct. 19, 2017, 9 pages.
International Preliminary Report on Patentability of International Application No. PCTGB20160509673, dated Oct. 19, 2017, 8 pages.
International Search Report and Written Opinion of International Application No. PCT/GB2016/050948, dated Jun. 2, 2016, 12 pages.
European Search Report of European Application No. EP15275113, dated Sep. 18, 2015, 6 pages.
Great Britain Search Report of Great Britain Application No. GB1506079.1, dated Oct. 5, 2015, 3 pages.
"Atmospheric lensing. A Weapon of Selective Destruction" by Steven J. Smith, Nov. 29, 2010. https://web.archive.org/web/20101129164210/http://whale.to/b/atmospheric_lensing.html, accessed on Mar. 10, 2015.
"Can we use atmospheric lenses as telescopes?" online discussion, last comment Oct. 30, 2014, http://www.thenakedscientists.com/forum/index.php?topic=52568.0, accessed on Mar. 10, 2015.
International Search Report and Written Opinion of International Application No. PCT/GB2016/050967, dated Jun. 1, 2016, 13 pages.
Brian W. Neiswander et al: "Plasma Lens for Optical Path Difference Control", AIAA Journal, vol. 50, No. 1, Jan. 1, 2012, pp. 123-130, XP055212822.
Bejot P et al: "32TW atmospheric white-light laser", Applied Physics Letters, American Institute of Physics, vol. 90, No. 15, Apr. 10, 2007, pp. 151106-151106.
Great Britain Search Report of Great Britain Application No. GB1506081.7, dated Oct. 8, 2015, 3 pages.
European Search Report of European Application No. EP15275114, dated Sep. 17, 2015, 8 pages.
International Search Report and Written Opinion of International Application No. PCT/GB2016/050984, dated Jun. 8, 2016, 15 pages.
Anonymous: "Plasma stealth—Wikipedia, the free encyclopedia", Mar. 21, 2015, XP055245259, Retrieved from the Internet: https://en.wikipedia.org/wiki/Plasma_stealth.
Bhaskar Chaudhury et al: "Stidy and Optimization of Plasma-Based Radar Cross Section Reduction Using Three-Dimensional Computations", IEEE Transactions on Plasma Science, IEEE Service Center, Piscataway, NJ, US, vol. 37, No. 11, Nov. 1, 2009, pp. 2116-2127.
Great Britain Search Report of Great Britain Application No. GB1506199.7, dated Sep. 30, 2015, 4 pages.
European Search Report of European Application No. EP15275181, dated Jan. 28, 2016, 10 pages.
International Search Report and Written Opinion of International Application No. PCT/GB2016/050980, dated Jun. 10, 2016, 15 pages.
Anonymous: "Deflector Shield—Wookieepedia—Wikia", 1999, XP055244465, Retrieved from the internet: URL:http://starwars.wikia.com/wiki/Deflector_shield/Legends.
Great Britain Search Report of Great Britain Application No. GB1506200.3, dated Sep. 30, 2015, 5 pages.
European Search Report of European Application No. EP15275183, dated Jan. 26, 2016, 10 pages.
International Search Report and Written Opinion of International Application No. PCT/GB2016/050873, dated May 31, 2016, 13 pages.

(56) References Cited

OTHER PUBLICATIONS

Baris I. Erkmen: "Computational ghost imaging for remote sensing", Hournal of the Optical Society of America A, vol. 29, No. 5, May 1, 2012, pp. 782-6600, XP055219044.
Baoqing Sun et al: "Normalized ghost imaging", Optics Express, vol. 20, No. 15, Jul. 16, 2012, p. 16892, XP055219055.
Great Britain Search Report of Great Britain Application No. GB1506089, dated Sep. 3, 2015, 3 pages.
European Search Report of European Application No. EP15275119, dated Oct. 12, 2015, 7 pages.
International Preliminary Report on Patentability of International Application No. PCTGB2016050948, dated Oct. 10, 2017, 8 pages.
European Search Report of European Application No. EP15275116.0, dated Sep. 17, 2015, 7 pages.
Great Britain Search Report of Great Britain Application No. GB1506085.8, dated Oct. 21, 2015, 3 pages.
PCT Search Report for PCT Application No. PCT/GB2016/051003, dated May 24, 2016, 13 pages.
Berreman, D.W., "A Lens or Light Guide Using Convectively Distorted Thermal Gradients in Gases", Bell System Technical Journal, vol. 43, issue 4, pp. 1469-1475, Jul. 1964.

\* cited by examiner

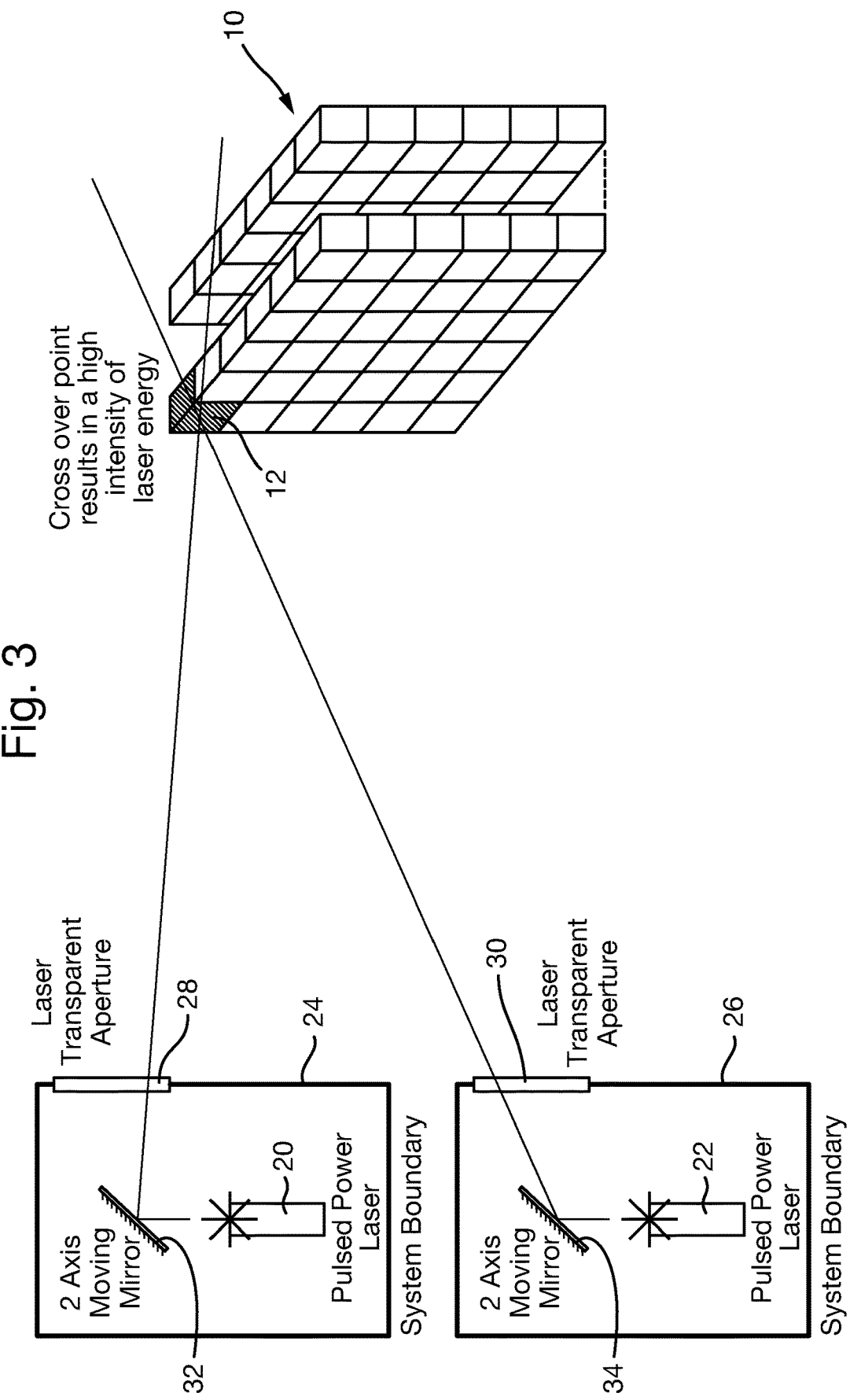

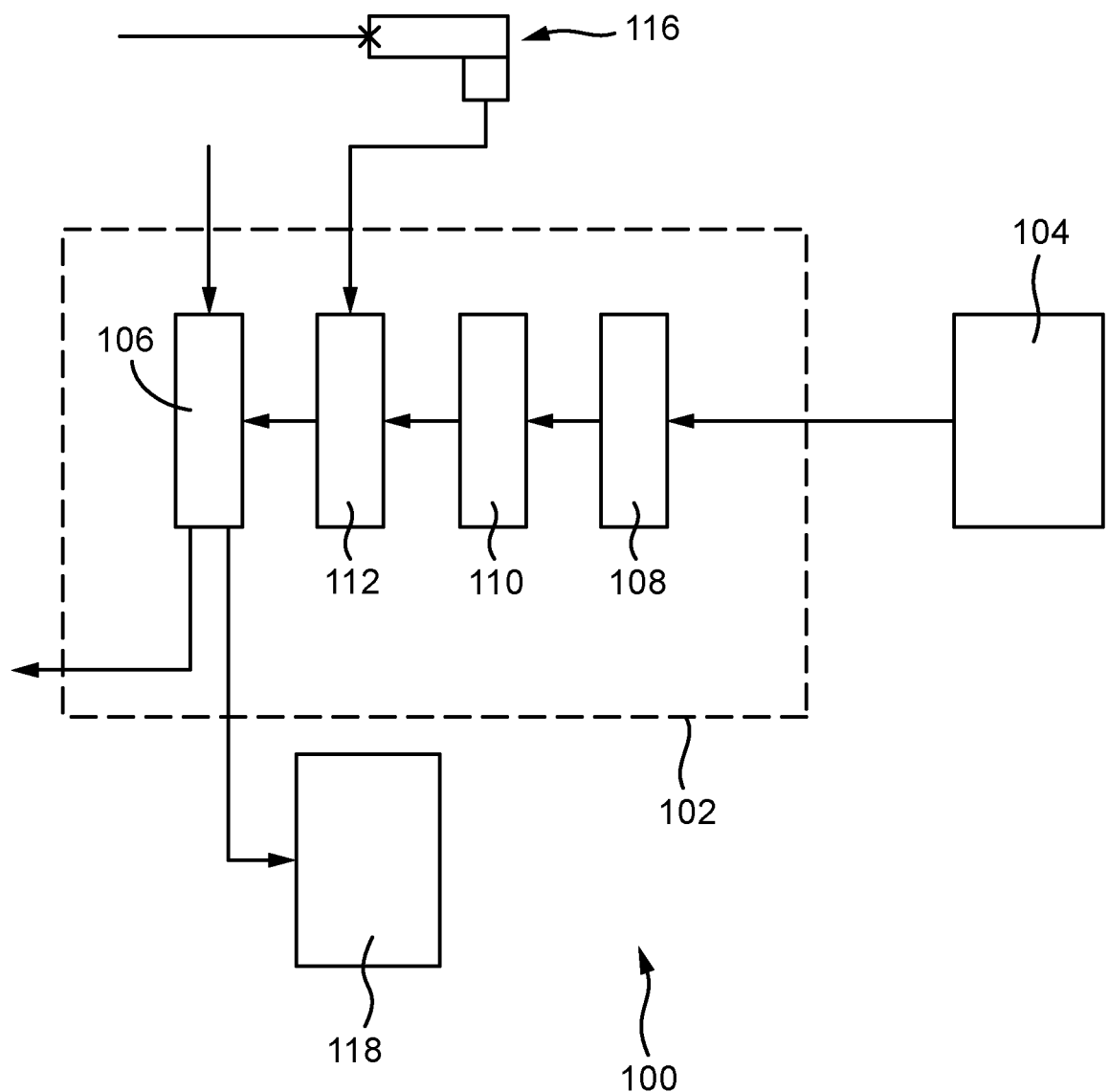

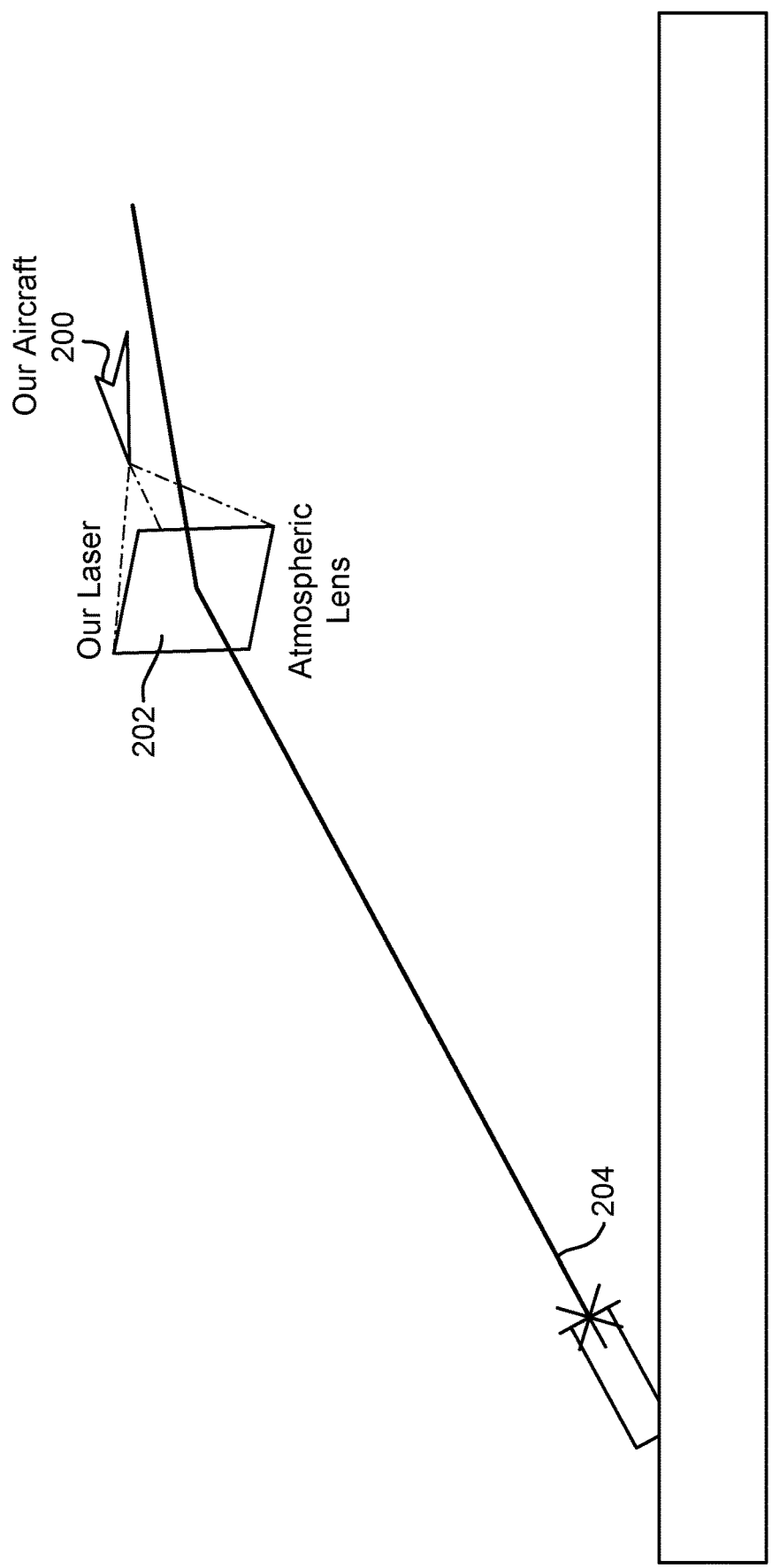

WEAPONS COUNTER MEASURE METHOD AND APPARATUS

RELATED APPLICATIONS

This application is a national phase application filed under 35 USC § 371 of PCT Application No. PCT/GB2016/050980 with an International filing date of Apr. 7, 2016 which claims priority of GB Patent Application 1506200.3 filed Apr. 10, 2015 and EP Patent Application 15275183.0 filed Aug. 4, 2015. Each of these applications is herein incorporated by reference in its entirety for all purposes.

This invention relates generally to a weapons counter measure method and apparatus and, more particularly but not necessarily exclusively, to a method and apparatus for protecting a target, such as an aircraft, from damage by a directed-energy weapon system.

A directed-energy weapon (DEW) emits highly focused energy, transferring that energy to a target to damage it. The energy can come in various forms, but the most prevalent types of DEW tend to employ electromagnetic radiation, including radio frequency, microwaves, lasers and masers.

Efforts have been made, in recent years, to develop coatings that can deflect beams fired by laser systems. Such coatings are made of several different substances, including low-cost metals, rare earths, carbon fibre, silver and diamonds that have been processed to fine sheens and tailored against specific weapons systems. Thus, artificial coatings on, for example, an aircraft body can counter certain types of lasers for a certain amount of time, but if a different type is used to that which the coating is designed to deflect, then the laser would burn through it even more quickly. Eventually, laser energy would burn through all such coatings, and the time that takes is simply a function of the laser power and the material used for the coating.

It would be desirable to provide a directed-energy weapons counter measure method and apparatus for protecting a target from damage by laser or other directed energy weapons systems that use concentrated electromagnetic radiation beams, which ameliorates at least some of the issues identified above.

Thus, in accordance with an aspect of the present invention, there is provided a directed-energy weapon counter measure apparatus for deflecting, away from a platform, focused electromagnetic energy emitted by a directed-energy weapon system, the apparatus comprising an electromagnetic radiation source, communicably coupled to a control system, said control system being configured to generate an atmospheric element operative to modify the focused electromagnetic energy within an atmospheric volume located in a path of said focused electromagnetic energy by causing electromagnetic radiation from said source to be applied to a selected plurality of three-dimensional portions of said atmospheric volume so as to heat and/or ionise the air within said portions so as to generate the atmospheric element, wherein said selected portions are spatially located together in a substantially unbroken, three-dimensional configuration.

The electromagnetic radiation source may include a beam steering mechanism for selectively steering a beam of electromagnetic radiation output therefrom, said control system optionally being communicably coupled to said beam steering mechanism and configured to generate signals for steering said beam of electromagnetic radiation relative to said atmospheric volume so as to sequentially apply electromagnetic radiation from said source to said selected portions.

The apparatus may comprise a beam splitting module for splitting a beam output from said electromagnetic radiation source into a plurality of paths corresponding to relative locations of selected portions.

In an exemplary embodiment of the invention, the control system may comprise a database on which is stored data representative of a three-dimensional matrix configuration of individual three-dimensional elements corresponding to an atmospheric element to be generated, and, optionally, a processor for mapping said stored three-dimensional matrix configuration of elements to respective selected portions of said atmospheric volume, the processor being configured to generate actuation signals configured to cause said electromagnetic radiation source to apply electromagnetic radiation to said selected plurality of portions of said atmospheric volume, corresponding to said stored three-dimensional configuration of elements, so as to heat and/or ionise the air therein and thereby generate the atmospheric element in the atmospheric volume.

The apparatus may further comprise an atmospheric element monitoring module for monitoring atmospheric conditions, generating data representative thereof, and transmitting said data to said processor, said processor being configured to generate adjusted actuation signals configured to adjust at least one characteristic of said electromagnetic radiation so as to compensate for atmospheric distortion.

In an exemplary embodiment of the invention, the apparatus may comprise a quality monitoring module for monitoring the performance of the atmospheric element against a predefined set of desired criteria, and generating signals to dynamically adjust beam steering and/or power of said electromagnetic radiation source so as to reduce or eliminate deviation of the properties and characteristics of the atmospheric element from that which is defined by the predefined criteria.

In an exemplary embodiment of the invention, the apparatus may comprise a detector module for detecting a focused electromagnetic energy beam emitted by a directed-energy weapon system and generating an actuation signal in response to detection thereof, said actuation signal being configured to cause said atmospheric element to be generated. The apparatus may further comprise a tracking module for tracking the path of said electromagnetic detector signal and generating a tracking signal for use by said control system to adjust the location of said atmospheric volume so as to maintain said atmospheric element within said path of said electromagnetic detector signal. The apparatus may further comprise a tracking module for tracking the path of said focused electromagnetic energy emitted by a directed-energy weapon system and generating a tracking signal for use by said control system to adjust the location of said atmospheric volume so as to maintain said atmospheric element within said path of said focused electromagnetic energy. In an alternative exemplary embodiment, on-board DEW detectors may be used to supply such tracking signals, if such detectors are present on the platform.

In apparatus according to an exemplary embodiment, the selected portions may be spatially located together in a substantially unbroken three-dimensional configuration corresponding to the three-dimensional shape of a generated atmospheric element.

The selected portions may be configured such that non-selected portions are in a configuration corresponding to a three-dimensional shape of a generated atmospheric element.

The control system may be configured to cause electromagnetic radiation from said source to be applied to a selected plurality of three-dimensional portions of said atmospheric volume so as to heat and/or ionise the air therein and thus change the refractive index thereof.

The atmospheric element may be operative to generate a radiation diverging device and said selected portions are spatially located together in a convex lens configuration. Alternatively, the selected portions may be spatially located together such that the non-selected portions are in a concave lens configuration.

The atmospheric element may be operative to generate a diffractive device and said selected portions define a plurality of three-dimensional shapes, each spatially separated from each other within said atmospheric volume. In this case, the three-dimensional shapes, spatially separated, may define a plurality of concentric transmissive and adjacent substantially opaque regions in the form of a zone plate.

The atmospheric element may be operative to generate a reflective device and the control system is configured to cause electromagnetic radiation from said source to be applied to a selected plurality of three-dimensional portions of said atmospheric volume so as to heat and/or ionise the air therein.

The electromagnetic radiation source may comprise one or more lasers.

In accordance with another aspect of the invention, there is provided a directed-energy weapon counter-measure method for deflecting, away from a platform, focused electromagnetic energy emitted by a directed-energy weapon system, the method comprising providing an electromagnetic radiation source and a control system communicably coupled thereto, the method further comprising dividing an atmospheric volume into a matrix of three dimensional portions, configuring said control system to generate an atmospheric element operative to deflect focused electromagnetic energy within an atmospheric volume located in a path of said focused electromagnetic energy by causing electromagnetic radiation from said source to be applied to a selected plurality of three-dimensional portions of said atmospheric volume so as to heat and/or ionise the air within said portions, wherein said selected portions are spatially located together in a substantially unbroken, three-dimensional configuration to generate the atmospheric lens.

The atmospheric volume may be divided into an array of three-dimensional portions, and the method may comprise the step of applying electromagnetic radiation to said selected portions within said array.

Aspects of the present invention extend to a control system for apparatus as described above, configured to be communicably coupled to an electromagnetic radiation source, said control system being configured to generate an atmospheric element within an atmospheric volume located in said focused electromagnetic energy path by causing electromagnetic radiation from said source to be applied to a selected plurality of three-dimensional portions of said atmospheric volume so as to heat and/or ionise the air within said portions, wherein said selected portions are spatially located together in a substantially unbroken, three-dimensional configuration to generate the atmospheric element.

These and other aspects of the present invention will be apparent from the following specific description in which embodiments of the present invention are described, by way of examples only, and with reference to the accompanying drawings, in which:

FIG. 3 is a schematic diagram illustrating an alternative manner in which laser power may be applied to selected cells within a matrix in accordance with the principles employed in another exemplary embodiment of the present invention;

FIG. 9 is a schematic block diagram illustrating apparatus for creating an atmospheric EM radiation path modifying component according to an exemplary embodiment of the present invention; and FIG. 10 is a schematic diagram illustrating the configuration and operation of apparatus according to an exemplary embodiment of the present invention.

Thus, aspects of the present invention operate on the principle of using one or more laser devices to selectively alter the refractive index and/or cause ionisation of portions of a three dimensional region of the atmosphere remote from the laser(s) so as to create or simulate an electromagnetic radiation path modifying component of a desired size and having selected electromagnetic radiation path modifying properties.

Figure 1:
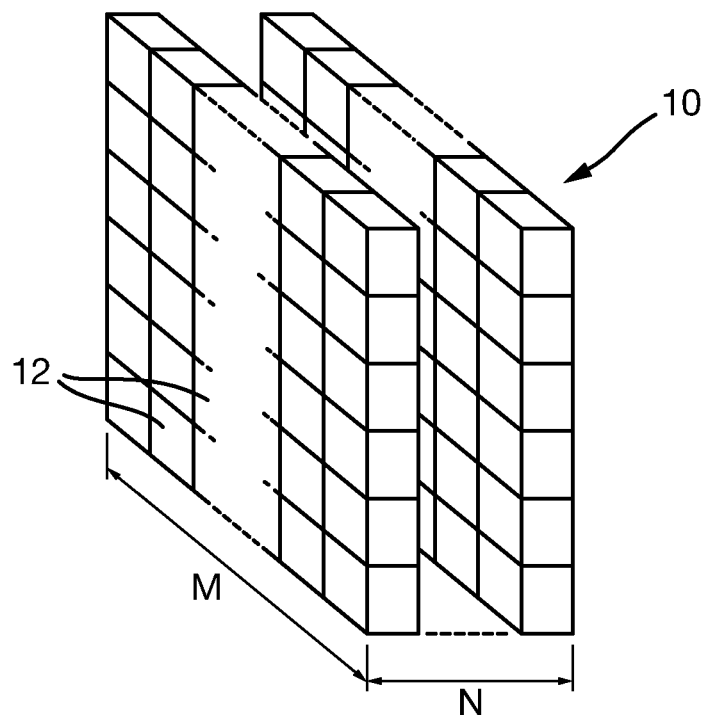
FIG. 1 is a schematic diagram illustrating the concept of an M by N cell matrix for the purposes of defining an atmospheric volume within which an atmospheric electromagnetic (EM) radiation path modifying component may be created in accordance with the principles employed in an exemplary embodiment of the present invention.

In general, and referring to FIG. 1 of the drawings, the volume of the atmosphere in which an EM radiation path modifying component is required to be created can be considered as a cell matrix 10 comprised of M rows and N columns or layers of 'cells' 12, wherein a cell is simply a predefined three-dimensional portion of the matrix. In the example shown, each cell is identical in size and shape, but this is not essential, and the present invention is not necessarily intended to be limited in this regard. It will also be appreciated that the number of cells in the vertical dimension of the cell matrix may vary. Thus, the cell matrix may be of any desired size, shape and number of cells.

Within the matrix 10, the three dimensional structure of an EM radiation path modifying device can be defined in terms of a number of cells 12 in a desired configuration, and it is these cells that will then be targeted by the laser source in order to effect the desired change in their respective properties (either by ionisation or heating to cause a change in refractive index).

It is known that an increase in temperature of a volume of air causes a corresponding decrease in density of that volume of air. As a result, the refractive index of warm air is lower than that of cooler (and therefore denser) air. Thus, some aspects of the present invention operate on the principle that by providing a volume of air that is warmer than the air around it, that volume of air can cause refraction of a beam of electromagnetic radiation as it passes through, in a manner similar to a convergent or divergent lens.

It is also known that if an electric field of a sufficiently high power is applied to a volume of air, the air may be ionised. Ionised air has reflective properties over a range of electromagnetic radiation wavelengths, such properties being a function of density and the type of ionisation created. Thus, some aspects of the present invention operate on the principle that by ionising a volume of air can cause it to reflect a beam of electromagnetic radiation as it hits that volume, in a manner similar to a mirror or similarly reflective device. A mixture of the two principles can be used to create a diffractive element, as will be described in more detail later.

Thus, referring back to FIG. 1 of the drawings, it will be appreciated that by selectively heating or ionising cells 12 within the matrix 10 a three dimensional atmospheric EM radiation path modifying component can be created using a high power electromagnetic radiation source. This may be achieved in a number of different ways. For example, a pulsed power laser (PPL) may be employed, and the 'Kerr' effect exploited therewith in order to attain self focusing of the laser beam at a required point (i.e. within the selected cell). Alternatively, a combination (i.e. crossing over) of two continuous wave (CW) laser beams at a required point may be used to achieve the desired effect. In any event, the laser system(s) is/are configured to selectively heat or ionise the atmosphere, thus changing its refractive index and electromagnetic properties such that electromagnetic energy passing through the heated cells is refracted and/or electromagnetic energy hitting the ionised cells is reflected.

Figure 2:
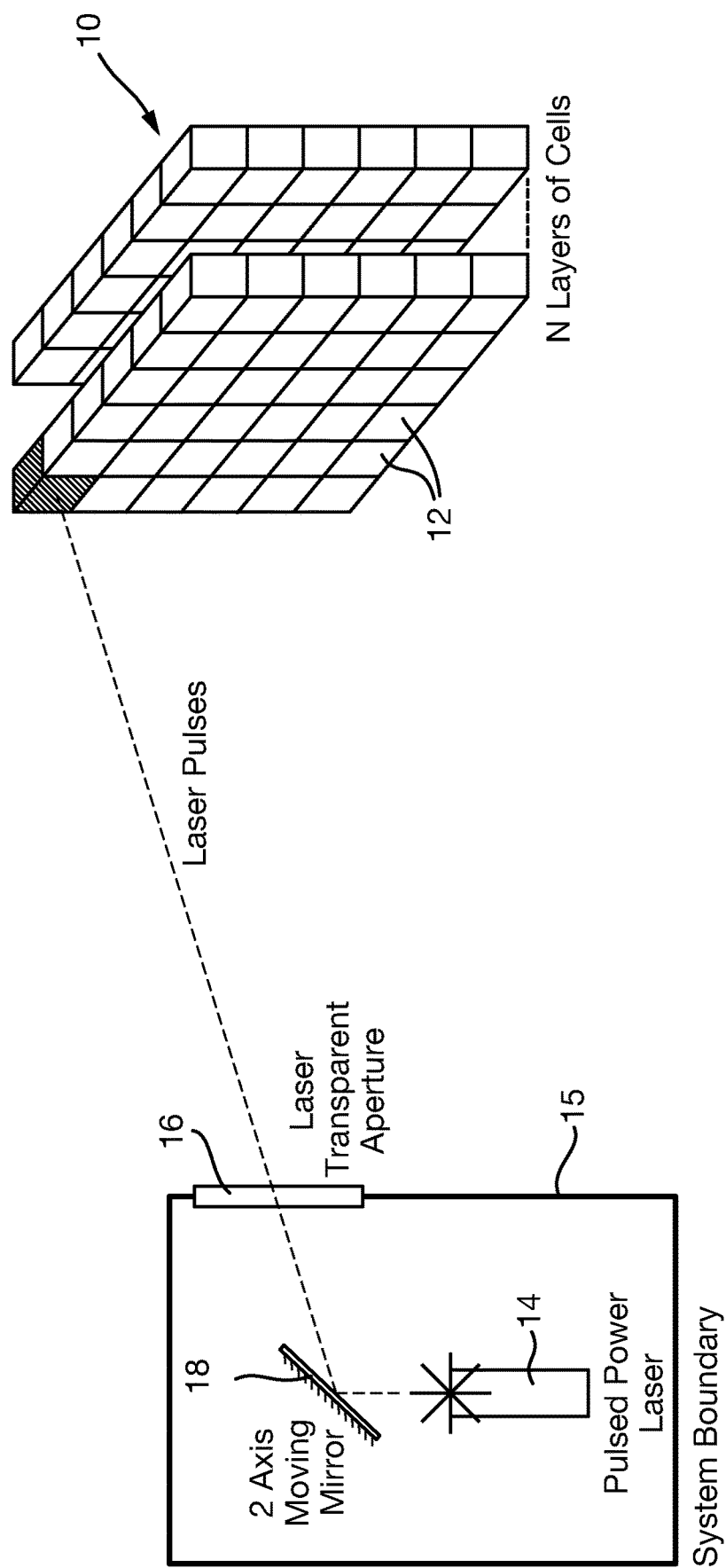
FIG. 2 is a schematic diagram illustrating the manner in which laser power may be applied to selected cells within a matrix in accordance with the principles employed in a first exemplary embodiment of the present invention.

Thus, referring to FIG. 2 of the drawings, apparatus according to one exemplary embodiment of the present invention comprises at least one laser source 14 mounted in an enclosure 15. In the example shown, the laser source 14 is a pulsed power laser source configured to emit high power laser pulses toward the cell matrix 10 via a laser transparent aperture 16. A reflective device, i.e. mirror, 18 is mounted on a dual-axis actuator (not shown) in the main laser output path, the actuator being communicably coupled with a control system that is configured to cause the actuator (and, therefore, the mirror 18) to move thereby to selectively direct the laser output through the aperture 16 toward selected cells 12 of the matrix 10. The control system may, for example, be configured to cause the laser output to be scanned across the cell matrix providing a pulse (or more than one pulse) to each selected cell, either via a raster pattern or a pattern optimised to suit the type of atmospheric component required to be created and its operational requirements.

As mentioned briefly above, the laser pulse is self-focusing by means of the 'Kerr' effect, thereby enabling it to deliver enough concentrated power to heat or ionise the cell at which it is directed. The Kerr effect is a change in the refractive index of a material in response to an applied electric field. In the case of a laser pulse of sufficiently high power, its electric field is sufficiently high to change the refractive index of the air. As a result, the cross-sectional area of the pulse (perpendicular to the direction of propagation) can be thought of as shrinking with distance (due to the differences in refractive index), thus bringing the pulse to an intense focus at some point down range of the laser, in this case at the selected cell. This intense focus is of sufficiently high intensity to heat or ionise the cell to change its refractive index and/or other EM radiation path modifying properties. One or more pulses may be provided per cell, dependent upon the desired effect and environmental conditions. It may also be necessary to periodically re-supply laser pulses to all selected cells to maintain the required change in refractive index and/or ionisation for as long as the atmospheric component is required, as once the laser power is removed from a cell, the air therein will very quickly return to its normal (unheated or non-ionised) state.

Referring to FIG. 3 of the drawings, in an alternative exemplary embodiment of the invention, two (or more) CW (continuous wave) laser sources 20, 22 may be provided in respective enclosures 24, 26, each having a laser transparent aperture 28, 30 therein. Once again, each laser system is provided with a mirror 32, 34 mounted on a dual-axis actuator (not shown) communicably coupled to a control system (not shown). Operation of the system is similar, in principle, to that described previously with reference to FIG. 3 of the drawings except, in this case, two (or more) spatially separated CW lasers (which may be mounted on the same platform or across different platforms) are used to selectively heat/ionise the atmosphere in each required cell. This is achieved by ensuring (through pointing) that the laser beams cross over at the same point (in the selected cell 12), thereby ensuring that sufficient power is attained. Such scanning may be performed on the basis of a control system configured to maintain a predetermined spatial separation and orientation between the atmospheric component and the electromagnetic radiation source. However, in an alternative exemplary embodiment, such scanning may be performed using a control system configured to direct the source(s) at specific coordinates corresponding to specific respective locations within the atmosphere.

In yet another exemplary embodiment, and either in addition to the above-mentioned arrangements or alternatively, it is envisaged that a beam splitter could be employed to split a laser beam into numerous new paths corresponding to the configuration of a plurality of respective cells to be targeted. Thus, a plurality of such cells could be targeted simultaneously, without the need for scanning a single laser path across the cell matrix.

In the following, a number of exemplary atmospheric electromagnetic radiation path modifying components that can be created according to the principles employed in respective exemplary embodiments of the present invention will now be described. However, it will be appreciated by a person skilled in the art that the principles set forth herein can be applied in numerous different ways in order to create other types and configurations of electromagnetic (EM) radiation path modifying components and the present invention is not necessarily intended to be limited in this regard.

Figure 4A:
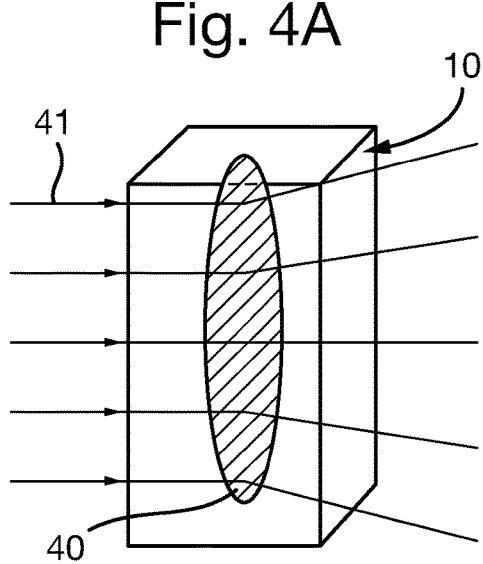
FIG. 4A is a schematic diagram illustrating an atmospheric diverging lens created in accordance with the principles employed in an exemplary embodiment of the present invention.
Figure 4B:
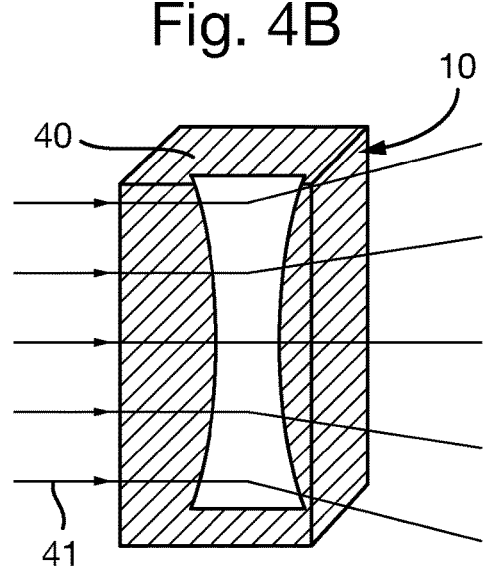
FIG. 4B is a schematic diagram illustrating an alternative atmospheric diverging lens created in accordance with the principles employed in an exemplary embodiment of the present invention.

Referring to FIG. 4A of the drawings, in one of its simplest forms, an exemplary embodiment of the present invention may be employed to create an atmospheric diverging lens. The illustrated lens 40 is of a double convex lens configuration and, in the example shown, has been created generally centrally within the cell matrix 10 with its longitudinal axis in line with the generally central vertical axis of the matrix 10. In order to create the lens 40, the cells corresponding to the three-dimensional 'structure' of a double convex lens are heated, for example using one of the methods described above, thereby to reduce the refractive index of those cells relative to the surrounding cells, and cause the rays of an incoming beam 41 of electromagnetic radiation to be refracted as they enter the component 40 and diverge. For the avoidance of doubt, it will be appreciated that the atmospheric component 40 is a three-dimensional volume within the cell matrix comprised of a plurality of atmospheric cells, each of which has been heated in order to attain the required refractive index. A control system and any number of lasers may be employed to ensure that the correct amount of laser power is applied to each cell in order to attain the required level of heating, having regard to environmental factors and the refractive index change required to be achieved. When the component is no longer required, the laser power can simply be removed, and the atmospheric cells will quickly return to their normal state. In an alternative exemplary embodiment, a diverging lens may be created in accordance with an exemplary embodiment of the invention, by heating the cells surrounding a three-dimensional configuration of cells in the shape of a double concave lens (similar in form to that of a conventional diverging lens). Thus, the resultant atmospheric element would comprise a concave lens-shaped region of unheated cells surrounded by a body of heated cells, as shown in FIG. 4B (wherein the shaded area 40 denotes the heated cells and the double concave lens region is unheated).

Figure 5A:
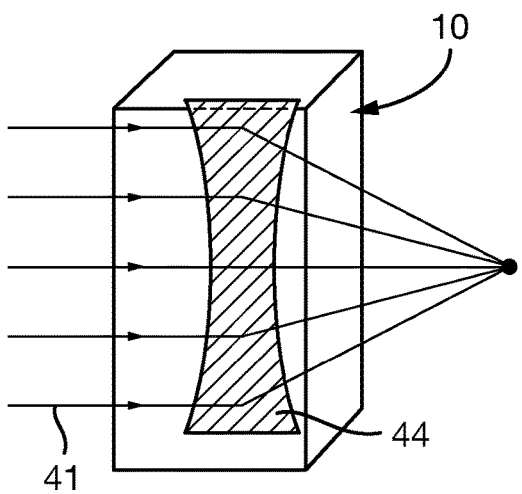
FIG. 5A is a schematic diagram illustrating an atmospheric converging lens created in accordance with the principles employed in an exemplary embodiment of the present invention.
Figure 5B:
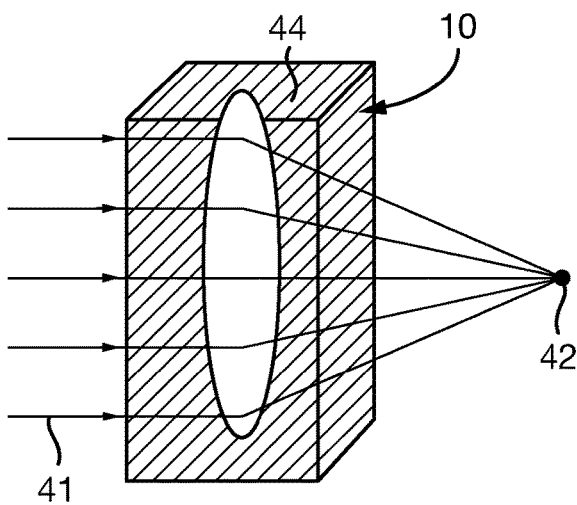
FIG. 5B is a schematic diagram illustrating an alternative atmospheric converging lens created in accordance with the principles employed in an exemplary embodiment of the present invention.

Referring to FIG. 5A of the drawings, an exemplary embodiment of the present invention may be used to create an atmospheric converging lens 44. Thus, in this particular case, the three-dimensional 'structure' represented by the heated cells within the matrix 10 comprises a double concave lens structure, wherein the rays of the incoming beam 41 of electromagnetic radiation are 'bent' or refracted as they enter the atmospheric component 44 and converge to a focal point 42. In an alternative exemplary embodiment, a converging lens may be created by heating the cells surrounding a three-dimensional configuration of cells in the shape of a convex lens (similar in form to that of a conventional converging lens). Thus, the resultant atmospheric element would comprise a convex lens-shaped region of unheated cells surrounded by a body of heated cells, as shown in FIG. 5B of the drawings (wherein the shaded area 44 denotes the heated cells and the double convex lens region is unheated). In yet another exemplary embodiment, the body of heated cells may form an annulus having, for example, a double convex cross-section.

In both cases described above with reference to FIGS. 4A and B and 5A and B of the drawings, the refractive index of the heated cells forming the lens structure is substantially constant, and the differing EM radiation path modifying properties (i.e. converging vs. diverging) are achieved by the geometry of the component. In other words, as with a physical component, it is just the geometry of the three dimensional volume of heated cells (or unheated cells) that defines the function of the resultant lens.

Figure 6:
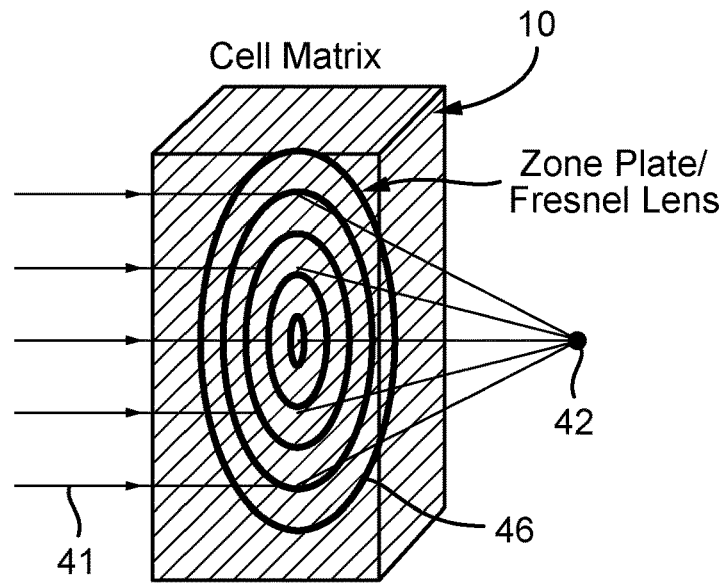
FIG. 6 is a schematic diagram illustrating an atmospheric Fresnel zone plate created in accordance with the principles employed in an exemplary embodiment of the present invention.

Referring now to FIG. 6 of the drawings, in yet another exemplary embodiment of the present invention, diffractive and refractive properties may be combined in order to create more complex atmospheric EM radiation path modifying components. In the illustrated example, a Fresnel zone plate 46 is defined substantially diagonally across the cell matrix 10. The zone plate 46 is formed of concentric rings of heated cells, diametrically separated by unheated cell regions; or it may be formed of concentric rings of ionised (reflective) cells diametrically separated by heated (or unheated) cells (transmissive). The resultant component combines refraction with the diffractive effects from boundaries between regions of significantly different refractive index and/or electromagnetic properties. Thus, it can be seen that more complex EM radiation path modifying components can be created by varying both the geometry and the refractive indices within the atmospheric 'structure'.

Figure 7:
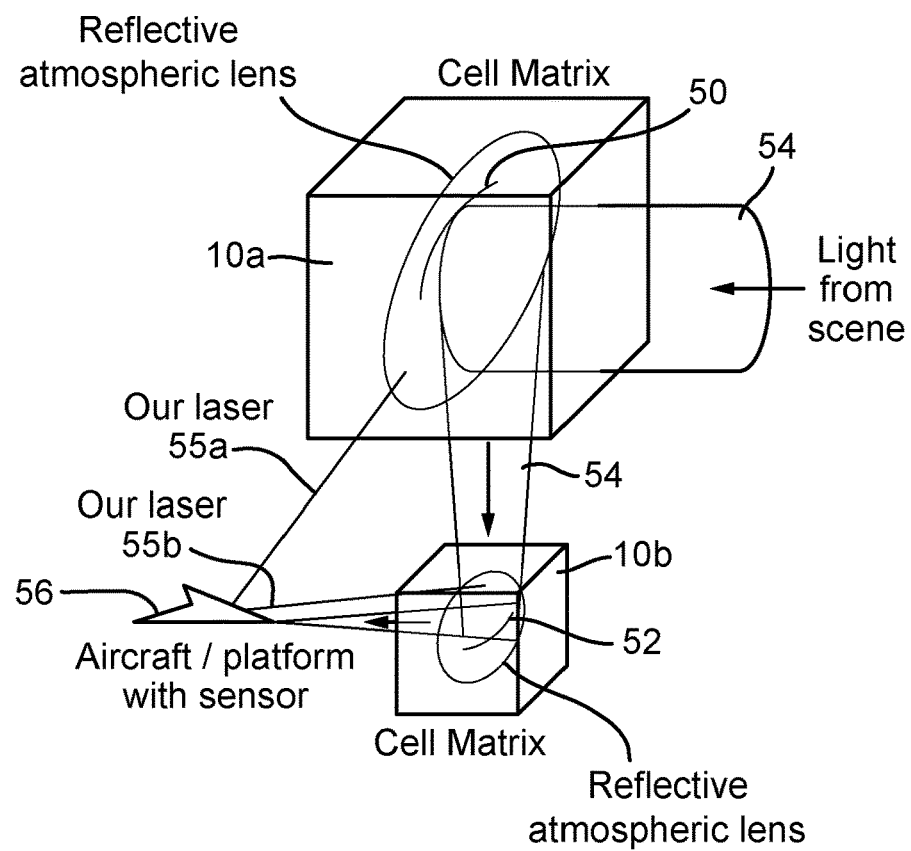
FIG. 7 is a schematic diagram of a focusing arrangement employing atmospheric reflective components created in accordance with the principles employed in an exemplary embodiment of the present invention.
Figure 7A:
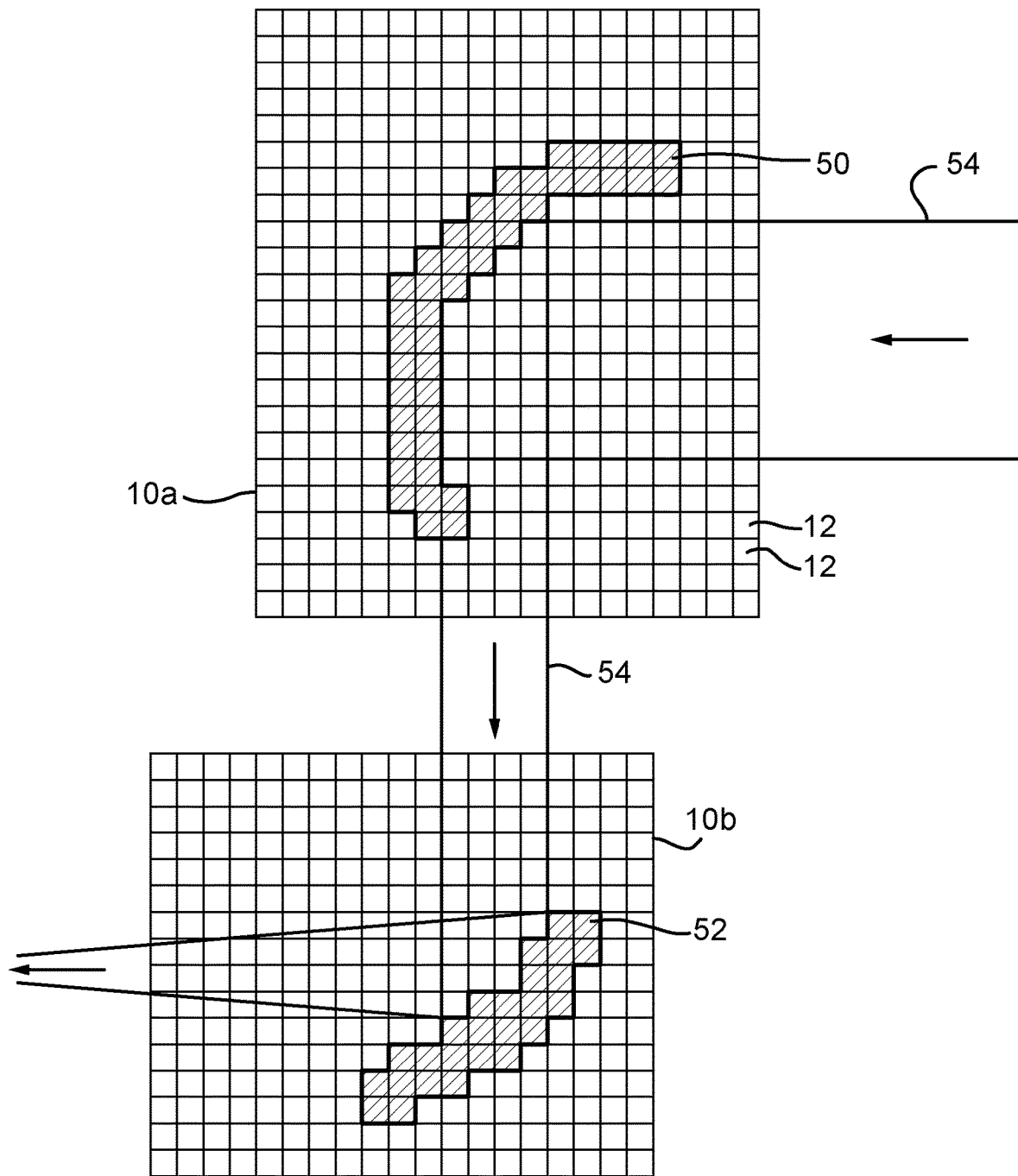
FIG. 7A is a schematic side view of the focusing arrangement of FIG. 7.

As explained above, it is also possible to simulate reflective components and arrangements in accordance with other exemplary embodiments of the present invention. Thus, referring to FIGS. 7 and 7A of the drawings, a focusing arrangement is illustrated which is comprised of two reflective atmospheric components 50, 52. In this case, two spatially separated cell matrices 10*a*, 10*b* are defined, both of which are three-dimensional concave elements (relative to the incoming beam of electromagnetic radiation 54).

The atmospheric reflective components 50, 52 are formed by ionisation of selected cells (in a configuration matching the required 'structure' and orientation of the respective components within the cell matrices 10*a*, 10*b*). In the example illustrated, the ionisation of the cells for both components may be effected by means of laser sources 55*a*, 55*b* mounted in or on the same platform, such as an aircraft 56 or the like. In use, an incoming beam 54 of electromagnetic radiation, such as electromagnetic energy emitted by a directed energy weapon system, for example, hits the first reflective component 50 and is reflected and (optionally) converged toward the second reflective component 52. The beam 54 is then reflected and (optionally) converged by the second reflective component 52 away from the platform.

In the examples illustrated, the cell matrices 10*a*, 10*b* are 'upright' and the orientation of the atmospheric elements is achieved by the pattern of the ionised/heated cells. However, it will be appreciated that, in alternative exemplary embodiments of the invention, the cell matrix itself may be oriented to match the required orientation of the atmospheric EM radiation path modifying element and, in this case, the populated cell pattern (relative to the cell matrix) will always be the same for a particular atmospheric element of a specified size. Also, it will be appreciated that a more 'curved' profile of the atmospheric components thus created may be achieved by varying the degree of heating/ionisation in the peripheral populated cells.

Figure 8:
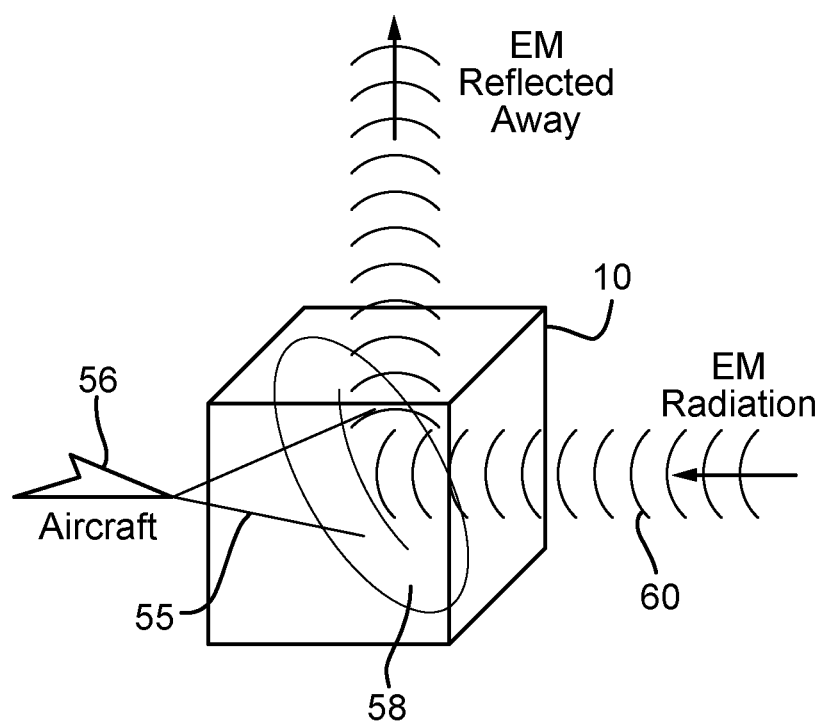
FIG. 8 is a schematic diagram of a diverting arrangement employing an atmospheric reflective component created in accordance with the principles employed in an exemplary embodiment of the present invention.

In yet another exemplary embodiment, and referring to FIG. 8 of the drawings, a diverting arrangement may be dynamically configured by an airborne platform 56 to divert electromagnetic radiation (such as focused electromagnetic energy emitted from a directed energy weapon system) therefrom. Thus, in this case, the on-board laser source(s) 55 may be used to ionise selected cells within a defined cell matrix 10 so as to create a three dimensional, reflective area therein which is oriented substantially diagonally across and through the matrix 10. The reflective area may be concave in the direction of the incoming electromagnetic radiation 60, as shown, but it may equally be planar, as convergence of the electromagnetic radiation is not necessarily required. The radiation 60 hits the atmospheric reflective component 58 thus created and is reflected through substantially 90°, away from the platform 56, as illustrated.

Referring to FIG. 9 of the drawings, an apparatus in accordance with an exemplary embodiment of the present invention for creating an atmospheric EM radiation path modifying component comprises a control module 100 communicably coupled to, for example, a dual-axis actuator on which a reflective component is mounted within a laser system such as that described above with reference to FIGS. 2 and 3 of the drawings. Such a laser system may, for example, be mounted in or on an airborne platform such as a manned aircraft or UAV.

The control module 100 comprises a processor 102 communicably coupled to a database 104. The database has stored therein data representative of one or more cell matrices, representative of respective atmospheric volumes, and the cells therein that need to be 'populated' (i.e. heated or ionised) in order to construct a respective three-dimensional atmospheric EM radiation path modifying element. Such data may also include information as to the degree of ionisation/heating required to be maintained in order to achieve the required EM radiation path modifying characteristics of the element. It will be appreciated that the database may simply include a single 'template' or populated cell matrix, bespoke to the platform or application in which the respective atmospheric element is to be used. However, in alternative exemplary embodiments, the database may include a plurality of different such templates from which a required atmospheric component can be selected for use, as required.

The processor 102 includes an input and an interface 106 for receiving an actuation signal indicative that an atmospheric component is required to be created, together with data representative of the size and orientation of the required component, and data representative of the position and orientation of the atmospheric component relative to the platform on which the apparatus is mounted, the electromagnetic radiation path to be modified and/or the laser source used to create the atmospheric component. The actuation signal and accompanying data may be manually entered by an operative, but may equally be automatically generated in response to detection of an electromagnetic signal from which the platform is required to be protected. A module may be provided that, not only detects an incoming focused electromagnetic energy beam emitted by a directed energy weapon system, but also tracks it as it moves relative to the platform, or the platform moves relative to this, and generates data that can be used to change the relative position and orientation of the atmospheric component so as to ensure that it remains within the path of the incoming directed energy weapon signal for as long as it is required to 'protect' the platform.

The processor 102, in response to the actuation signal, searches the database 104 for the populated cell matrix data corresponding to the atmospheric component required to be created, and retrieves the associated data. A transformation module 108 is provided, which transforms the matrix cell data onto data representative of the real atmospheric matrix cell within which the EM radiation path modifying component is to be created, both in terms of size and orientation thereof, and determines precise coordinates for the location of each real atmospheric cell relative to the corresponding respective cell of the stored matrix (and also relative to the platform on which the apparatus is mounted, the electromagnetic source to be modified and/or the laser source used to create the atmospheric component), and a mapping module 110 maps the respective population data from the stored cell matrix onto the data representative of the real atmospheric cell matrix accordingly. Thus, the processor now knows the precise physical location of each cell in the real atmospheric cell matrix and the cell 'population' pattern required to create the atmospheric component. Finally, such data is converted, by a signal processing module 112, into a scanning pattern comprised of a pattern of actuation signals configured to move and actuate the laser beam(s) in order to selectively heat/ionise the real atmospheric cell matrix in the required pattern (and to the required degree) to create the three-dimensional atmospheric element. In other words, the actuation signals are configured to control the power and beam steering of the laser source(s) to heat/ionise each selected cell as required.

The control module may include (or be communicably coupled to) a detector module for detecting a focused electromagnetic energy beam and generating an actuation signal in response to detection thereof. The control module may further comprise (or be communicably coupled to) a tracking module for tracking the path of said focused electromagnetic energy and generating a tracking signal for use by said control system to adjust the location of said atmospheric volume so as to maintain said atmospheric element within said path of said focused electromagnetic energy. The tracking module may, in fact, comprise an on-board DEW detector, which has, as its aim, to minimise the incoming DEW electromagnetic signal. The signals from the DEW detector can be employed to adjust the location and/or size and/or orientation of the atmospheric element, possibly incrementally, in order to minimise the received DEW signal reaching the platform.

Furthermore, an atmospheric component monitoring system 116 may be provided within, or communicably coupled to, the control module 100. The atmospheric component monitoring system 116 may, for example, comprise a low power laser of a suitable wavelength (as will be apparent to a person skilled in the art) to detect atmospheric effects. Thus, the monitoring system 116 may form part of a feedback loop with the signal processing module 112 to enable the actuation signals to be adjusted to compensate for atmospheric distortion. In alternative exemplary embodiments, the apparatus may comprise a quality monitoring module for monitoring the performance (i.e. the properties and characteristics) of the atmospheric element against a predefined set of desired criteria, and generating signals to dynamically adjust beam steering and/or power of the electromagnetic radiation source so as to reduce or eliminate deviation of the properties and characteristics of the atmospheric element from that which is defined by the predefined criteria. Such deviation may be caused by atmospheric distortion or otherwise. In other words, successive and/or continuous 'fine tuning' of the atmospheric element is facilitated to create and maintain an atmospheric element having consistently desired characteristics and quality. Furthermore, and as described above, such 'fine tuning' may include the use of the above-mentioned DEW detector signals which can be used by the control system to assist in minimising the incoming DEW electromagnetic signal incident on the platform.

Referring to FIG. 10 of the drawings, in a directed-energy weapon counter measure apparatus according to an exemplary embodiment of the present invention, the control system mounted on an aerial platform 200 may be configured (in response to detection of an incoming DEW laser, or other focused electromagnetic energy, beam) to create, in the manner described above, a large atmospheric diverging lens 202 or a large reflective element (using on-board laser sources 201) at a location within the propagation path of an adversary DEW (e.g. laser) beam 204. The atmospheric lens 202, in this case, comprises a volume of heated cells configured together to form a double convex lens formation, as described above. However, it may, alternatively, for example, comprise a body of ionised cells configured to simulate a suitable oriented reflective device. In yet another exemplary embodiment, the atmospheric element 202 may be diffractive, possibly having a configuration such as that described above.

In the case of a diverging (refractive) lens, the lens 202 has the effect of receiving an incoming laser beam 204 and diverging it such that it is deflected away from the platform 200 as it exits the lens, thus protecting the platform 200 from damage thereby. As stated above, a similar result may be achieved, for example, if a reflective atmospheric element were to be employed, which comprises a three-dimensional volume of ionised cells that emulates the operation of a mirror or reflector device. The tracking module described above is configured to track the direction of the laser beam 204, as it may be altered in an effort to bypass the counter measure, and generate signals configured to cause the control module to alter the location and/or orientation of the atmospheric element 202 to maintain optimum deflection characteristics in respect of the DEW laser beam.

It will be appreciated by a person skilled in the art from the foregoing description that modifications and variations can be made to the described embodiments, without departing from the scope of the present invention as defined by the appended claims. For example, the control system may be configured, in the event that multiple incoming DEW beams are detected in respect of a single platform, to cause multiple respective atmospheric elements, appropriately sized and oriented relative to the incoming beam, to be created.

The invention claimed is:

1. A counter measure apparatus for deflecting, away from a platform, a path of focused electromagnetic energy emitted by a directed-energy weapon system, the apparatus comprising an electromagnetic radiation source, communicably coupled to a control system, said control system being configured to generate a diffractive atmospheric element operative to modify the path of the focused electromagnetic energy within an atmospheric volume located in said path of said focused electromagnetic energy by causing electromagnetic radiation from said source to be applied to a selected plurality of three-dimensional portions of said atmospheric volume so as to heat and/or ionise the air within said portions so as to generate the atmospheric element, wherein said selected portions are spatially located together in a substantially unbroken, three-dimensional configuration.

2. The apparatus according to claim 1, wherein said electromagnetic radiation source includes a beam steering mechanism for selectively steering a beam of electromagnetic radiation output therefrom, said control system being communicably coupled to said beam steering mechanism and configured to generate signals for steering said beam of electromagnetic radiation relative to said atmospheric volume so as to sequentially apply electromagnetic radiation from said source to said selected portions.

3. The apparatus according to claim 1, wherein said control system comprises a database on which is stored data representative of a three-dimensional matrix configuration of individual three-dimensional elements corresponding to an atmospheric element to be generated, and a processor for mapping said stored three-dimensional matrix configuration of elements to respective selected portions of said atmospheric volume, the processor being configured to generate actuation signals configured to cause said electromagnetic radiation source to apply electromagnetic radiation to said selected plurality of portions of said atmospheric volume, corresponding to said stored three-dimensional configuration of elements, so as to heat and/or ionise the air therein and thereby generate the atmospheric element in the atmospheric volume.

4. The apparatus according to claim 1, further comprising an atmospheric element monitoring module for monitoring atmospheric conditions, generating data representative thereof, and transmitting said data to said processor, said processor being configured to generate adjusted actuation signals configured to adjust at least one characteristic of said electromagnetic radiation so as to compensate for atmospheric distortion.

5. The apparatus according to claim 1, further comprising a quality monitoring module for monitoring the performance of the atmospheric element against a predefined set of desired criteria, and generating signals to dynamically adjust beam steering and/or power of said electromagnetic radiation source so as to reduce or eliminate deviation of the properties and characteristics of the atmospheric element from that which is defined by the predefined criteria.

6. The apparatus according to claim 1, comprising a detector module for detecting a focused electromagnetic energy beam emitted by said directed energy weapon system and generating an actuation signal in response to detection thereof, said actuation signal being configured to cause said atmospheric element to be generated.

7. The apparatus according to claim 6, further comprising a tracking module for tracking the path of said focused electromagnetic energy emitted by said directed energy weapon system and generating a tracking signal configured to cause said control system to adjust the location of said atmospheric volume so as to maintain said atmospheric element within said path of said focused electromagnetic energy.

8. The apparatus according to claim 1, wherein said selected portions are spatially located together in a substantially unbroken three-dimensional configuration corresponding to the three-dimensional shape of a generated atmospheric element.

9. The apparatus according to claim 1, wherein said selected portions are configured such that non-selected portions are in a configuration corresponding to a three-dimensional shape of a generated atmospheric element.

10. The apparatus according to claim 1, wherein the control system is configured to cause electromagnetic radiation from said source to be applied to a selected plurality of three-dimensional portions of said atmospheric volume so as to heat and/or ionise the air therein and thus change the refractive index thereof.

11. The apparatus according to claim 10, wherein said atmospheric element is operative to generate a radiation diverging device and said selected portions are spatially located together in a convex lens configuration.

12. The apparatus according to claim 10, wherein said atmospheric element is operative to generate a radiation diverging device and the selected portions are spatially located together such that the non-selected portions are in a concave lens configuration.

13. The apparatus according to claim 1, wherein the atmospheric element is operative to generate a reflective device and the control system is configured to cause electromagnetic radiation from said source to be applied to a selected plurality of three-dimensional portions of said atmospheric volume so as to heat and/or ionise the air therein.

14. A directed-energy weapon counter-measure method for deflecting, away from a platform, the path of focused electromagnetic energy emitted by a directed-energy weapon system, the method comprising providing an electromagnetic radiation source and a control system communicably coupled thereto, the method further comprising dividing an atmospheric volume into a matrix of three dimensional portions, configuring said control system to generate an atmospheric element operative to deflect focused electromagnetic energy within an atmospheric volume located in said path of said focused electromagnetic energy by causing electromagnetic radiation from said source to be applied to a selected plurality of three-dimensional portions of said atmospheric volume so as to heat and/or ionise the air within said portions, wherein said selected portions are spatially located together in a substantially unbroken, three-dimensional configuration to generate the atmospheric element.

15. A control system for apparatus according to claim 1, configured to be communicably coupled to an electromagnetic radiation source, said control system being configured to generate an atmospheric element within an atmospheric volume located in said path of said focused electromagnetic energy by causing electromagnetic radiation from said source to be applied to a selected plurality of three-dimensional portions of said atmospheric volume so as to heat and/or ionise the air within said portions, wherein said selected portions are spatially located together in a substantially unbroken, three-dimensional configuration to generate the atmospheric element.

* * * * *